United States Patent
Bezel et al.

(10) Patent No.: US 9,097,577 B2
(45) Date of Patent: Aug. 4, 2015

(54) ADAPTIVE OPTICS FOR COMPENSATING ABERRATIONS IN LIGHT-SUSTAINED PLASMA CELLS

(75) Inventors: Ilya Bezel, Sunnyvale, CA (US); Anatoly Shchemelinin, Pleasanton, CA (US); Yanming Zhao, Milpitas, CA (US); Matthew Derstine, Los Gatos, CA (US)

(73) Assignee: KLA—Tencor Corporation, Milpitas, CA (US)

(*) Notice: Subject to any disclaimer, the term of this patent is extended or adjusted under 35 U.S.C. 154(b) by 470 days.

(21) Appl. No.: 13/529,582

(22) Filed: Jun. 21, 2012

(65) Prior Publication Data

US 2013/0003384 A1 Jan. 3, 2013

Related U.S. Application Data

(60) Provisional application No. 61/502,732, filed on Jun. 29, 2011.

(51) Int. Cl.
*F21V 13/00* (2006.01)
*G01J 3/02* (2006.01)
*G02B 26/06* (2006.01)
*H01J 65/04* (2006.01)

(52) U.S. Cl.
CPC .............. *G01J 3/021* (2013.01); *G01J 3/0208* (2013.01); *G02B 26/06* (2013.01); *H01J 65/04* (2013.01)

(58) Field of Classification Search
CPC ........ G01J 3/0208; G01J 3/021; G02B 26/06; H01J 65/04
USPC ............. 250/493.1; 313/231.61; 362/84, 228, 362/259, 276
See application file for complete search history.

(56) References Cited

U.S. PATENT DOCUMENTS

| | | | |
|---|---|---|---|
| 8,853,655 B2 * | 10/2014 | Bezel et al. .................. | 362/259 |
| 2006/0245035 A1 | 11/2006 | Uchida et al. | |
| 2007/0228288 A1 | 10/2007 | Smith | |
| 2007/0228300 A1 | 10/2007 | Smith | |
| 2009/0174930 A1 | 7/2009 | McCahon et al. | |
| 2009/0267005 A1 | 10/2009 | Bykanov et al. | |

FOREIGN PATENT DOCUMENTS

RU 1832180 A1 8/1993

* cited by examiner

*Primary Examiner* — Stephen F Husar
(74) *Attorney, Agent, or Firm* — Suiter Swantz pc llo

(57) ABSTRACT

A system for compensating abberative effects caused by a bulb of a plasma cell includes an illumination source configured to generate illumination; a plasma cell, the plasma cell including a bulb for containing a volume of gas; an ellipse configured to focus illumination from the illumination source into the volume of gas in order to generate a plasma within the volume of gas; and one or more adaptive optical elements configured to compensate for aberrations produced by one or more optical elements, the one or more adaptive optics elements positioned along an illumination pathway between the illumination source and the plasma cell.

38 Claims, 8 Drawing Sheets

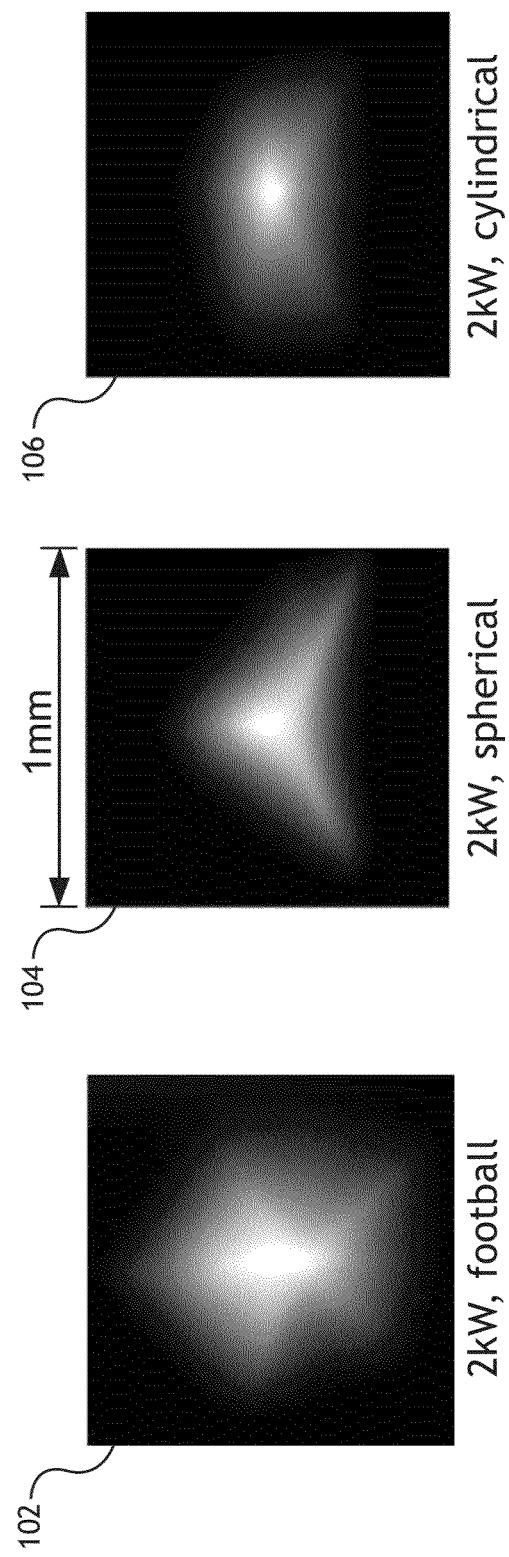

ADAPTIVE OPTICS FOR COMPENSATING ABERRATIONS IN LIGHT-SUSTAINED PLASMA CELLS

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a regular (non-provisional) patent application of U.S. Provisional Patent Application entitled THE USE OF ADAPTIVE OPTICS TO COMPENSATE ABERRATIONS IN THE LASER-SUSTAINED PLASMA CELLS, naming Ilya Bezel, Anatoly Shchemelinin, and Matthew Derstine as inventors, filed Jun. 29, 2011, Application Ser. No. 61/502,732.

TECHNICAL FIELD

The present invention generally relates to plasma based light sources, and more particularly to the use of adaptive optics to correct for aberrations in laser-sustained plasma cells.

BACKGROUND

As the demand for integrated circuits having ever-smaller device features continues to increase, the need for improved illumination sources used for inspection of these ever-shrinking devices continues to grow. One such illumination source includes a laser-sustained plasma source. Laser-sustained plasma light sources are capable of producing high-power broadband light. Laser-sustained light sources operate by focusing laser radiation into a gas volume in order to excite the gas, such as argon or xenon, into a plasma state, which is capable of emitting light. This effect is typically referred to as "pumping" the plasma.

The shape of a given plasma is, in part, defined by the laser light intensity distribution near the laser focus. Optical aberrations may impact the quality of laser focus and generally limit the predictability of the resulting plasma shape. In a general sense, any intervening medium may produce optical aberrations in the laser light focused into the bulb of the plasma cell. For example, imperfections in any of the optical elements of an optical pathway used to generate the plasma may produce aberrations in the light. In order to contain the gas used to generate the plasma, an implementing plasma cell requires a "bulb," which is configured to contain the gas species as well as the generated plasma. The bulb of the plasma cell itself serves as a major source of optical aberration in a laser-sustained plasma light source. The production of optical aberrations in laser-sustained plasma light sources results in larger than desired plasma volumes as well as a lack of an ability to control the bulb envelope. This lack of control in turn leads to irreproducible plasma shapes.

Commonly bulb aberrations are controlled by manufacturing bulbs with minimized bulb aberration. FIGS. 1A through 1C illustrate a series of plasma shapes generated utilizing different bulb shapes, with varying levels of optical aberration. FIG. 1A depicts a plasma shape generated by a "football" shaped bulb, while FIG. 1B depicts a plasma shape generated by a spherical bulb. FIG. 1C illustrates the smallest and brightest of the plasmas. The plasma in FIG. 1C was generated using a cylindrical shaped bulb and possessed the smallest amount of aberrations of the FIGS. 1A-1C. Relying on the minimization of aberrations based on medium selection is limited. In a practical sense, aberrations cannot be entirely avoided. Further, the selection of an aberration minimizing bulb provides no mitigation to aberrations generated by additional elements of the plasma light source or aberrations caused by convection within the plasma light source. Therefore, it would be desirable to provide a system and method for correcting aberrations in a laser-sustained plasma light source that corrects the deficiencies identified in the prior art.

SUMMARY

An apparatus for correcting aberrations created in a plasma cell is disclosed. In one aspect, the apparatus may include, but is not limited to, an illumination source configured to generate illumination; a plasma cell, the plasma cell including a bulb for containing a volume of gas; an ellipse configured to focus illumination from the illumination source into the volume of gas in order to generate a plasma within the volume of gas; and one or more adaptive optical elements configured to compensate for aberrations produced by one or more optical elements, the one or more adaptive optics elements positioned along an illumination pathway between the illumination source and the plasma cell.

In another aspect, an apparatus may include, but is not limited to, an illumination source configured to generate illumination; a plasma cell, the plasma cell including a bulb for containing a volume of gas; an ellipse configured to focus illumination from the illumination source into the volume of gas in order to generate a plasma within the volume of gas; and one or more adaptive optics elements configured to compensate for aberrations produced by one or more optical elements, the one or more adaptive optics elements positioned along a collection pathway between the plasma cell and a target of illumination from the plasma cell.

An apparatus for correcting convection based aberrations is disclosed. In one aspect, the apparatus may include, but is not limited to, an illumination source configured to generate illumination; a plasma cell, the plasma cell including a bulb for containing a volume of gas; an ellipse configured to focus illumination from the illumination source into the volume of gas in order to generate a plasma within the volume of gas; and one or more adaptive optics elements configured to compensate for aberrations produced by convection, the one or more adaptive optics elements positioned along an illumination pathway between the illumination source and the plasma cell. The apparatus may further include a wavefront sensor positioned in the illumination pathway or a collection pathway; and a controller communicatively coupled to the wavefront sensor, the controller configured to control the one or more adaptive optics in response to one or more measurements received from the wavefront sensor.

A method for correcting aberrations created by a plasma cell is disclosed. In one aspect, the method may include, but is not limited to, providing a plasma cell including a bulb for containing a volume of gas; generating illumination; focusing the illumination into the volume of gas in order to generate a plasma within the volume of gas; and compensating for aberration effects produced by one or more optical elements by adjusting one or more characteristics associated with a wavefront of the illumination focused into the volume of gas.

A method for correcting convection based aberrations is disclosed. In one aspect, the method may include, but is not limited to, providing a plasma cell including a bulb for containing a volume of gas; generating illumination; focusing the illumination into the volume of gas in order to generate a plasma within the volume of gas; and compensating for aberration produced by convection within at least one of a volume of gas within the illumination pathway or the volume of gas within the bulb of the plasma cell.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 1 illustrates a series of plasma shapes resulting from various optical aberrations acquired utilizing optical imaging techniques, in accordance with one embodiment of the present invention.

DETAILED DESCRIPTION OF THE INVENTION

Figure 2A:
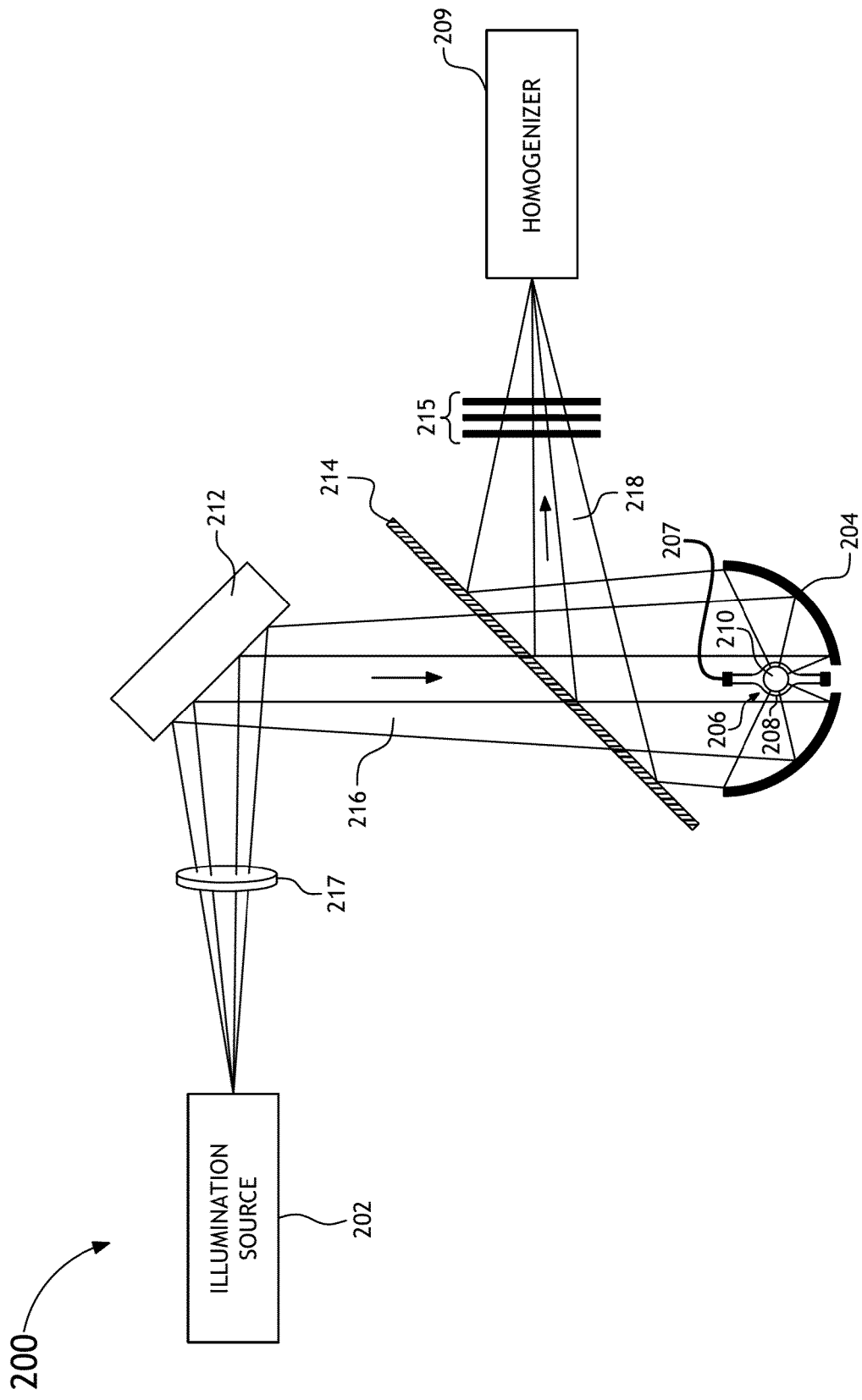
FIG. 2A is a block diagram view of a system for correcting aberrations caused by one or more optical elements, in accordance with one embodiment of the present invention.

Reference will now be made in detail to the subject matter disclosed, which is illustrated in the accompanying drawings.

Referring generally to FIGS. 2 through 5, a system and method for correcting aberrations in an optical system used for plasma generation are described in accordance with the present disclosure.

FIGS. 2A-2D illustrate a system 200 suitable for correcting aberrations in light-sustained plasma cells, in accordance with one embodiment of the present invention. The system 200 suitable for correcting aberrations in a plasma cell may include an illumination source 202 configured to generate illumination of a selected wavelength, and a plasma cell 206 configured for generating a plasma within a bulb suitable for containing a selected gas (e.g., argon, xenon, mercury or the like). In addition, the system 200 may include an ellipse 204 configured to focus illumination emanating from the illumination source 202 into the volume of gas 210 contained within the bulb 208 of the plasma cell 206. By focusing illumination of the illumination pathway 216 into the volume of gas 210, energy is absorbed through one or more selected absorption lines of the gas or plasma within the bulb 208, thereby "pumping" the gas species in order to generate or sustain a plasma. The generation of plasma within inert gas species is generally described in U.S. patent application Ser. No. 11/695,348, filed on Apr. 2, 2007; U.S. patent application Ser. No. 11/395,523, filed on Mar. 31, 2006, which are incorporated herein in their entirety. In a general sense, the system 200 should be interpreted to extend to any plasma based light source known in the art.

In one aspect of the present invention, the system 200 includes one or more adaptive optics elements 212 configured to compensate for aberrations in a light-sustained plasma cell. The adaptive optics elements 212 may be positioned along an illumination pathway 216 between the illumination source 202 and the plasma cell 206. In one sense, the adaptive optics 212 are configured to direct illumination from the illumination source 202 along an illumination pathway 216 to the ellipse 204. Based on observed abberative effects created by one or more optical elements (e.g., lens 217, mirror 214, ellipse 204, and the like) of the system 200 or the bulb 208 of the plasma cell 206, the adaptive optics 212 may be controlled by a user interface or a control system in order to compensate for the aberrations such that wavefront error is reduced below a selected tolerance level. In this regard, the adaptive optics 212 may be configured to adjust the wavefront of the illumination 216 from the illumination source 202 such that the wavefront error at the mirror 214, upon emanating from the bulb 208, is below a selected level. As such, the adaptive optics 212 may be utilized to minimize the abberative effects of the bulb 208 of the plasma cell 206 or any other optical element of the system 200.

In one embodiment, the aberrations may be produced by the bulb 208 of the plasma cell 206. For example, aberrations may be caused by manufactured characteristics of the bulb 208. In another embodiment, the aberrations may be caused by changes in one or more operation conditions of the bulb 208 of the plasma cell 206. For example, changes in temperature of the bulb 208 of the plasma cell 206 may cause a deformation or stress in the bulb 208, which in turn may lead to aberration of light from the plasma cell 206.

In another embodiment, the aberrations may be produced by one or more optical elements of the illumination path or collection path of system 200. For example, the aberrations may be caused by manufacturing characteristics of the lens 217, the ellipse 204, or the mirror 214 of the illumination pathway. In another embodiment, the aberrations may be caused by changes in one or more operational conditions of the one or more optics of the illumination pathway 116 or collection pathway 118. For example, changes in the temperature of the ellipse 204 of the may cause a deformation or stress in the ellipse 204, which in turn may lead to aberration of light from the plasma cell 206.

In an exemplary embodiment, the adaptive optics 212 may be adjusted following the installation or adjustment of one or more optical elements of the system 200 or the bulb 20 of the plasma cell 206. For example, the adaptive optics 212 may be adjusted following installation of a bulb 208 of the plasma cell 206. It is noted herein that the aberrations associated with manufacturing of optical components and the bulb 208 may generally remain constant, provided the orientation of the optical components and/or bulb with respect to the illumination source 202 does not change. For example, the adaptive optics 212 may be adjusted to correct for a measured aberration associated with a given bulb 208 following installation or spatial adjustment of the bulb 208. Once the adaptive optics 212 have been adjusted to compensate for the measured abberative effects generated by the "fresh" bulb 208, the configuration of the adaptive optics 212 may remain approximately constant, thereby continuously compensating for the abberative effects of the bulb 208. It is further anticipated that they procedure described above may be carried out for any of the optical components (e.g., lenses, mirrors, ellipse 204, and the like) of the system 200.

It is further noted that corrections to aberrations may be carried out on a "cold" system, prior to operation of the system 200. For example, the aberration measurements may be performed with or without the plasma cell activated (i.e., producing plasma). For instance, the illumination source (e.g., probe beam) may be run at very low power in order to quantify the persisting aberrations (i.e., associated with manufacturing or arrangement of optical elements).

In a further embodiment, the abberative effects of the bulb 208 (or another intervening medium) may be measured utilizing a wavefront sensor (not shown). For instance, a beam splitter (not shown) may be placed in the collection pathway 218 of the system 200 and configured to direct a portion of light emanating from the bulb 208 to a wavefront sensor. In one embodiment, the results of the wavefront sensing process may be acquired by a user and then used to adjust the adaptive optics 212 to compensate for the measured abberative effects. In another embodiment, the results of the wavefront sensing process may be fed to a communicatively coupled computer controller (not shown). The computer controller may then determine the adaptive steps to perform that will best minimize the observed aberrations. In this sense, the computer controller may execute a series of program instructions stored in memory and configured to control the adaptive optics in order to minimize the abberative effects of a distorting medium. In turn, the computing control system may transmit instructions to the adaptive optics in order to execute the determined set of instructions.

In another embodiment, the adaptive optics 212 may be adjusted in order to correct for aberrations produced by a change in one or more operational conditions (e.g., deformation or stress). In this regard, the system 200 is configured to perform run-time adjustments. It is noted herein that the adjustments may take place on a relatively long time scale. For instance, the adjustments may be made once after thermal equilibration of the various optical elements of the system 200. As in the feedback system described above, a beam splitter (not shown) may be placed in an optical pathway (e.g., collection pathway 118 or illumination pathway 216) of the system 200 and configured to direct a portion of light emanating from the bulb 208 to a wavefront sensor. Following thermal equilibration of one or more of the optical elements (e.g., lenses, mirrors, ellipse, and etc.) or the bulb 208, results of the wavefront sensing process may be acquired by a user or computer controller and then used to adjust the adaptive optics 212 to compensate for the measured abberative effects, much in the same way as described above.

Figure 2B:
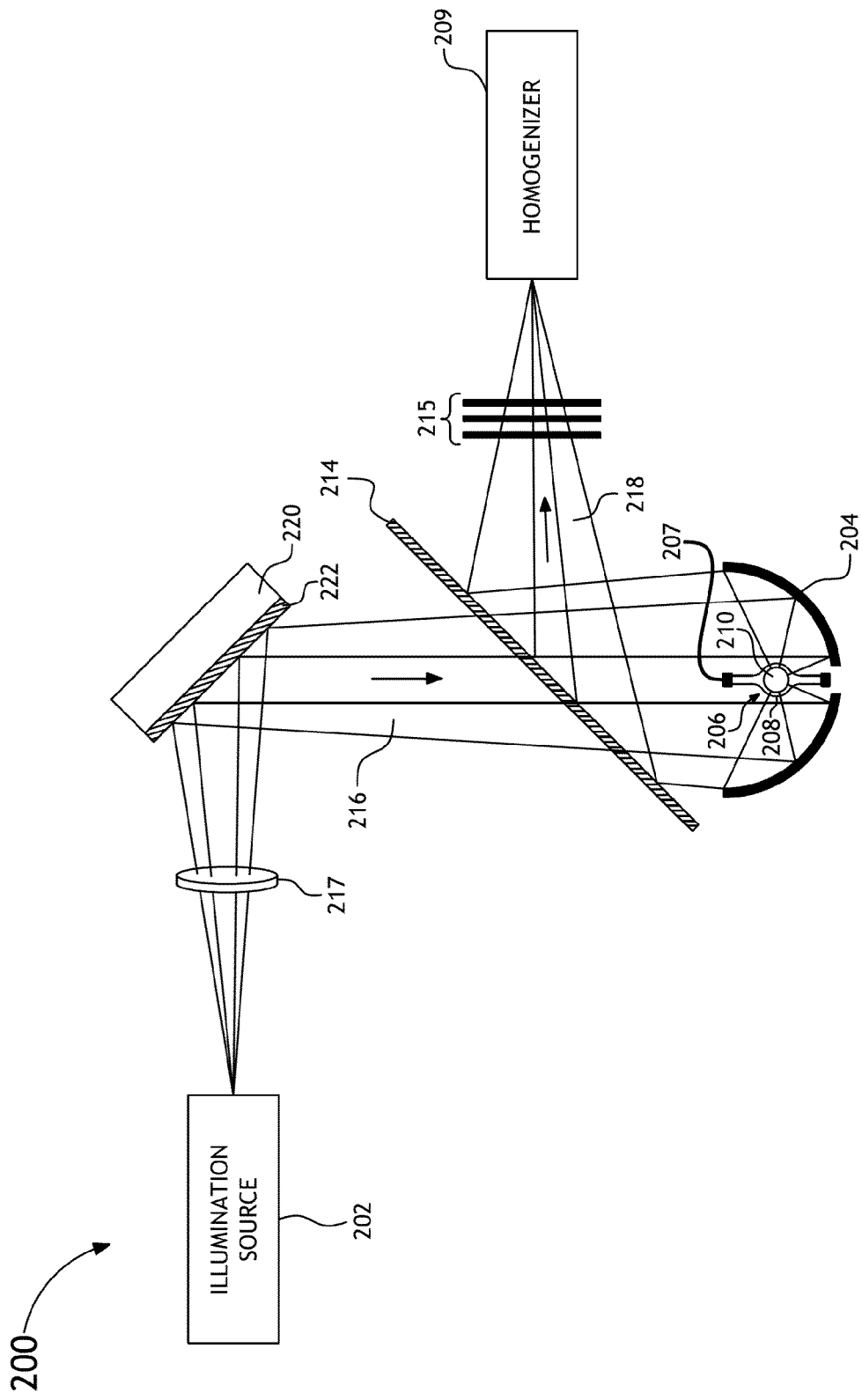
FIG. 2B is a block diagram view of a system for correcting aberrations caused by one or more optical elements, in accordance with one embodiment of the present invention.

Referring now to FIG. 2B, the one or more adaptive optics may include a deformable mirror 220 configured to compensate for aberrations produced by the bulb of the plasma cell or one or more optical elements of the system 200. In this regard, the deformable mirror 220 is configured to correct wavefront error produced by the bulb 208 or one or more optical elements of the system 200. The deformable mirror 220 may be configured to adjust the wavefront of the illumination 216 such that the wavefront reflecting from the surface of the deformable mirror 220 is adjusted relative to the illumination incident on the deformable mirror 220. For example, this adjustment may be performed in a manner that minimizes the abberative effects of the bulb 208 of the plasma cell 206 at or below a predetermined level as measured at a point (e.g., mirror 214) downstream from the bulb 208. In this sense, the deformable mirror 220 may be adjusted to a point that the abberative effects due to the bulb 208 are minimized. In one embodiment, the results of the wavefront sensing process may be acquired by a user and then used to adjust the deformable mirror 220 to compensate for the measured abberative effects. For example, the deformable mirror 220 may be adjusted repeatedly (i.e., trial and error) until a minimization in the observed abberative effects is found. In another example, a computing control system (not shown) may act to repeatedly adjust the deformable mirror 220 until the computing control system measures a minimum in the observed aberration (i.e., substantially minimized wavefront error).

In another embodiment, as shown in FIG. 2B, the system 200 may further include one or more correction plates 222 suitable for correcting at least a portion of the abberative effects associated with the bulb 208 of the plasma cell 206 or one or more optical elements of system 200. In one aspect, the one or more correction plates 222 are positioned within an illumination pathway 216 between the illumination source 202 and the volume of gas 210 of the plasma cell 206. In this regard, the one or more correction plates 222 may be configured to correct for predictable wavefront error. In a further embodiment, the one or more correction plates 222 may be implemented in conjunction with a deformable mirror 220. In this sense, the one or more correction plates 222 may correct for predictable wavefront error, while the deformable mirror 220 may correct unpredictable wavefront error.

Figure 2C:
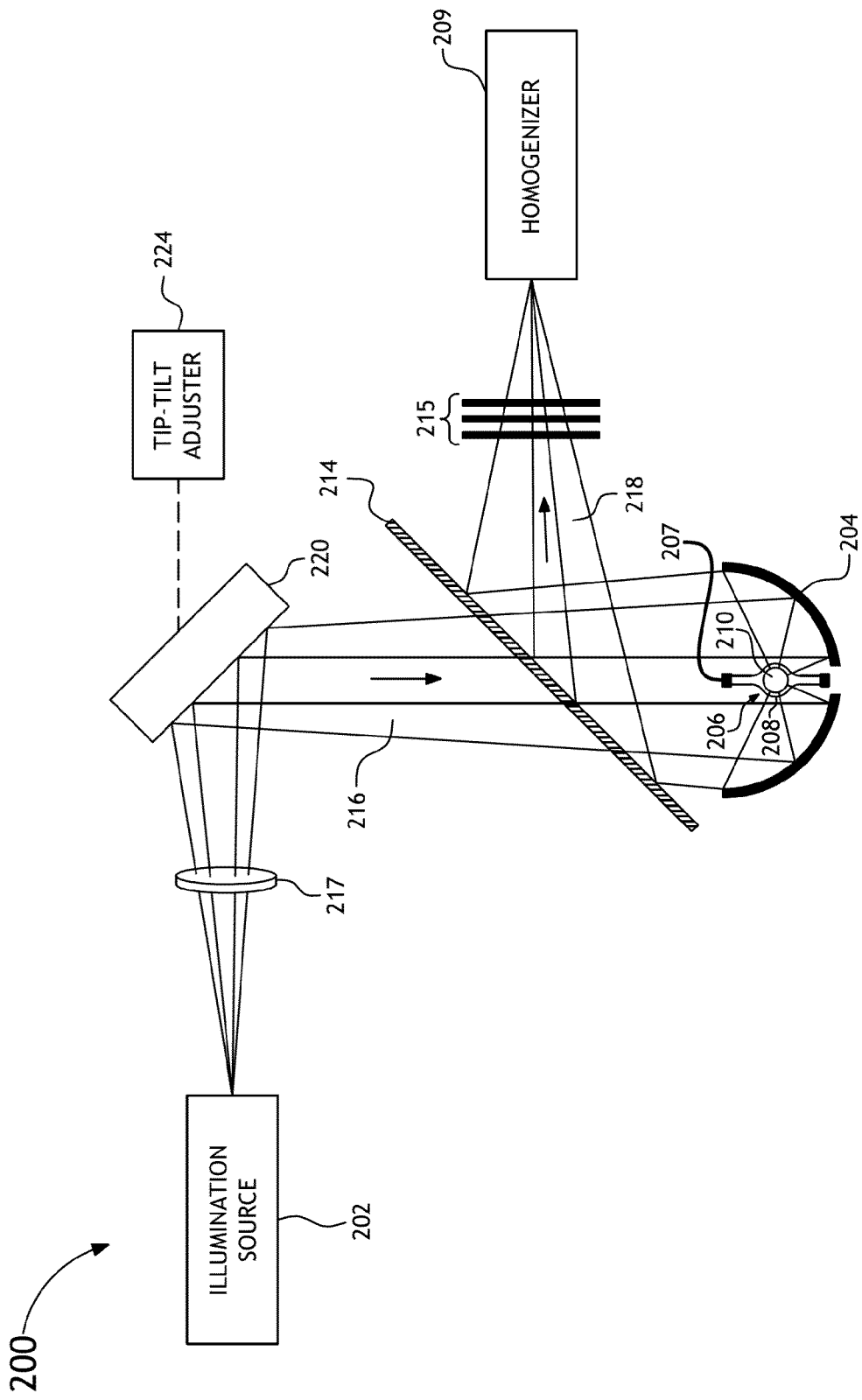
FIG. 2C is a block diagram view of a system for correcting aberrations caused by one or more optical elements, in accordance with one embodiment of the present invention.

Referring now to FIG. 2C, the adaptive optics 212 may include a tip-tilt adjuster 224 configured to adjust the tip-tilt of the deformable mirror 220. For example, the overall tip-tilt bias may be measured for the deformable mirror 220. Then, the tip-tilt adjuster 224 may adjust the entire deformable mirror 220 in order to compensate for the measured tip-tilt bias. It is recognized herein that any tip-tilt adjuster or adjusting process may be implemented in the context of the present invention.

Figure 2D:
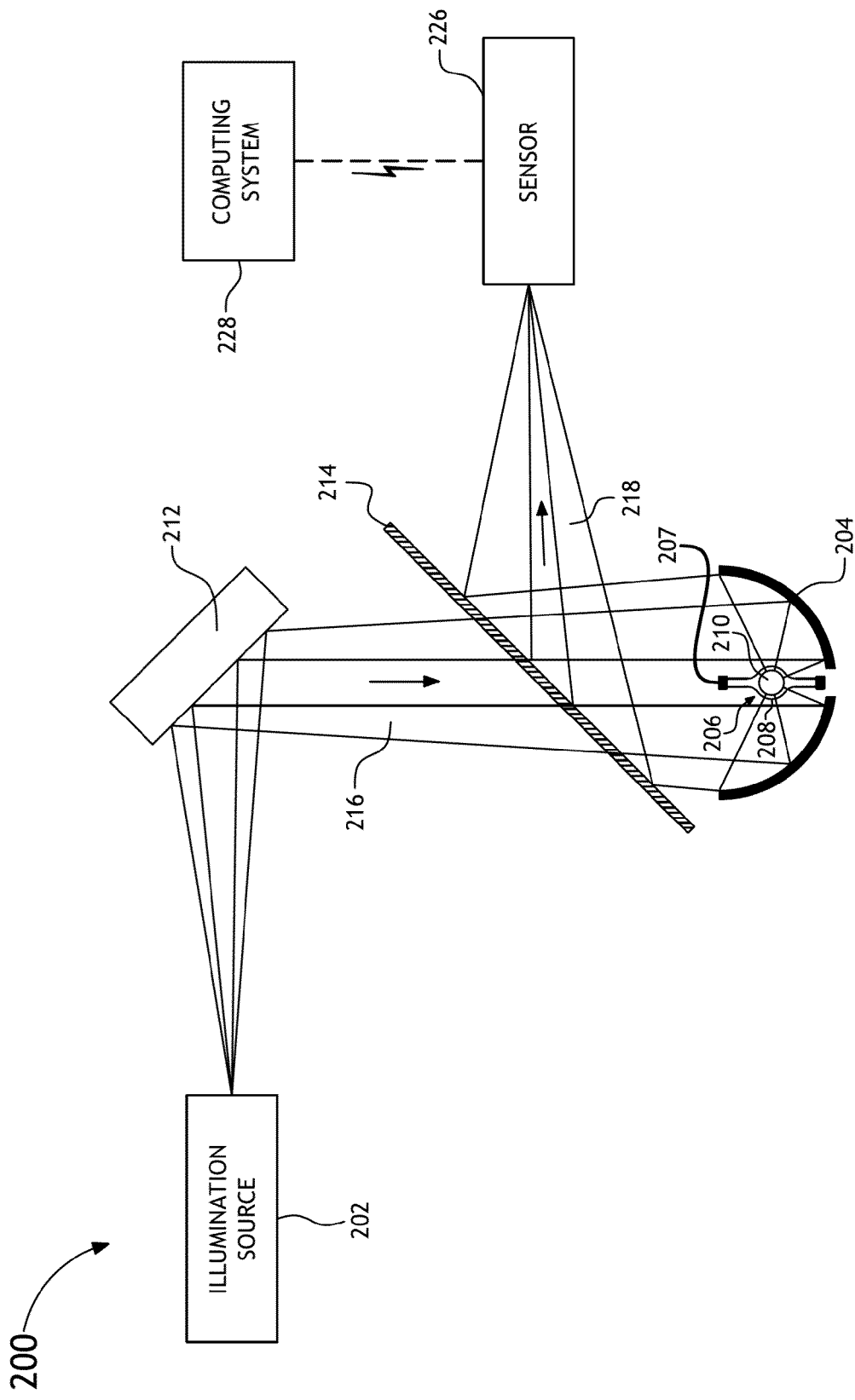
FIG. 2D is a block diagram view of a system for correcting aberrations caused by one or more optical elements, in accordance with one embodiment of the present invention.

Referring now to FIG. 2D, the system 200 may further include one or more sensors 226 configured to measure one or more characteristics of the plasma generated within the volume of gas 210 of the bulb 208. The system 200 may further include a computer control system 228 communicatively coupled to the one or more sensors 226. In this regard, the one or more sensors 226 may transmit a signal indicative of the measured one or more characteristics of the plasma to the computing system 228. In turn, the computer control system 228 may calculate a selected merit function utilizing the measured one or more characteristics of the plasma 210. For example, the calculated merit function may include, but is not limited to, a brightness of the plasma, an amplitude of a selected emission line of the plasma, a plasma temperature, a plasma size, a plasma shape, a beam profile of illumination transmitted through the bulb. In a further embodiment, the adaptive optics 212 may be adjusted in response to the one or more measured merit functions of the plasma. In this regard, a user or a control system may select the merit function to be optimized and then utilize the adaptive optics to optimize the selected merit function.

While the preceding description has focused on describing the present invention in the context of a set of adaptive optics 212 positioned along an illumination pathway 216 between the illumination source 202 and the plasma cell 206, it is further contemplated herein that the adaptive optics 212 of the present invention may be positioned along the collection pathway 218 of the system 200 between the plasma cell 212 and a target of the radiation emitted by the plasma cell 212.

In a further aspect of the present invention, system 200 may include various additional optical elements. In one embodiment, the set of optics may include collection optics configured to collect broadband light emanating from the bulb 208 of the plasma cell 206. For instance, the system 200 may include a cold mirror 214 configured to direct illumination from the ellipse to downstream optics, such as a homogenizer 209.

In another embodiment, the set of optics may include one or more additional lenses (e.g., 217) placed along either the illumination pathway 216 or the collection pathway 218. The lenses may be utilized to focus illumination from the illumination source 202 into the volume of gas 210 of the plasma cell 206. Alternatively, the additional lenses may be utilized to focus broadband light emanating from the plasma cell 206 onto a selected target (not shown). In a further embodiment, the set of optics may include one or more filters 215 placed along either the illumination pathway 216 or the collection pathway 218 in order to filter illumination prior to light entering the plasma bulb 208 or to filter illumination following emission of the light from the bulb 208. It is noted herein that the set of optics of system 200 as described above and illustrated in FIGS. 2A through 2D are provided merely for illustration and should not be interpreted as limiting. It is anticipated that a number of equivalent optical configurations may be utilized in the context of the present invention. Moreover, it is further contemplated that the abberative correction techniques described above may be used to correct for aberrations associated with any of the additional optical elements.

It is contemplated herein that the present invention may be utilized to sustain a plasma in a variety of gas environments. In one embodiment, the gas of the plasma cell may include an inert gas (e.g., noble gas or non-noble gas) or a non-inert gas (e.g., mercury). For example, it is anticipated herein that the volume of gas 210 of the present invention may include argon. For instance, the gas 210 may include a substantially pure argon gas. In another instance, the gas 210 may include a mixture of argon gas with an additional gas. It is further noted that the present invention may be extended to a number of gases. For example, gases suitable for implementation in the present invention may include, but are not limited, to argon, xenon, mercury, and the like. In a general sense, the present invention should be interpreted to extend to any light pump plasma generating system and should further be interpreted to extend to any type of gas suitable for sustaining a plasma within a plasma cell.

In another aspect of the present invention, the illumination source 202 may include one or more lasers. In a general sense, the illumination source 202 may include any laser system known in the art. For instance, the illumination source 202 may include any laser system known in the art capable of emitting radiation in the visible or ultraviolet portions of the electromagnetic spectrum. In one embodiment, the illumination source 202 may include a laser system configured to emit continuous wave (CW) laser radiation. For example, in settings where the gas of the volume 210 is or includes argon, the illumination source 202 may include a CW laser (e.g., fiber laser or disc Yb laser) configured to emit radiation at 1069 nm. It is noted that this wavelength fits to a 1068 nm absorption line in argon and as such is particularly useful for pumping the gas 210. It is noted herein that the above description of a CW laser is not limiting and any CW laser known in the art may be implemented in the context of the present invention.

In another embodiment, the illumination source 202 may include one or more diode lasers. For example, the illumination source 202 may include one or more diode laser emitting radiation at a wavelength corresponding with any one or more absorption lines of the species of the gas of the plasma cell. In a general sense, a diode laser of the illumination source 202 may be selected for implementation such that the wavelength of the diode laser is tuned to any absorption line of any plasma (e.g., ionic transition line) or an absorption line of the plasma-producing gas (e.g., highly excited neutral transition line) known in the art. As such, the choice of a given diode laser (or set of diode lasers) will depend on the type of gas 210 utilized in the plasma cell 206 of the present invention.

In another embodiment, the illumination source 202 may include an ion laser. For example, the illumination source 202 may include any noble gas ion laser known in the art. For instance, in the case of an argon-based plasma, the illumination source 202 used to pump argon ions may include an Ar+ laser.

In one another embodiment, the illumination source 202 may include one or more frequency converted laser systems. For example, the illumination source 202 may include a Nd:YAG or Nd:YLF laser having a power level exceeding 100 Watts. In another embodiment, the illumination source 202 may include a broadband laser. In another embodiment, the illumination source may include a laser system configured to emit modulated laser radiation or pulse laser radiation.

In another aspect of the present invention, the illumination source 202 may include one or more non-laser sources. In a general sense, the illumination source 202 may include any non-laser light source known in the art. For instance, the illumination source 202 may include any non-laser system known in the art capable of emitting radiation discretely or continuously in the visible or ultraviolet portions of the electromagnetic spectrum.

In another aspect of the present invention, the illumination source 202 may include two or more light sources. In one embodiment, the illumination source 202 may include two or more lasers. For example, the illumination source 202 (or illumination sources) may include multiple diode lasers. By way of another example, the illumination source 202 may include multiple CW lasers. In a further embodiment, each of the two or more lasers may emit laser radiation tuned to a different absorption line of the gas or plasma within the plasma cell 206.

Figure 3:
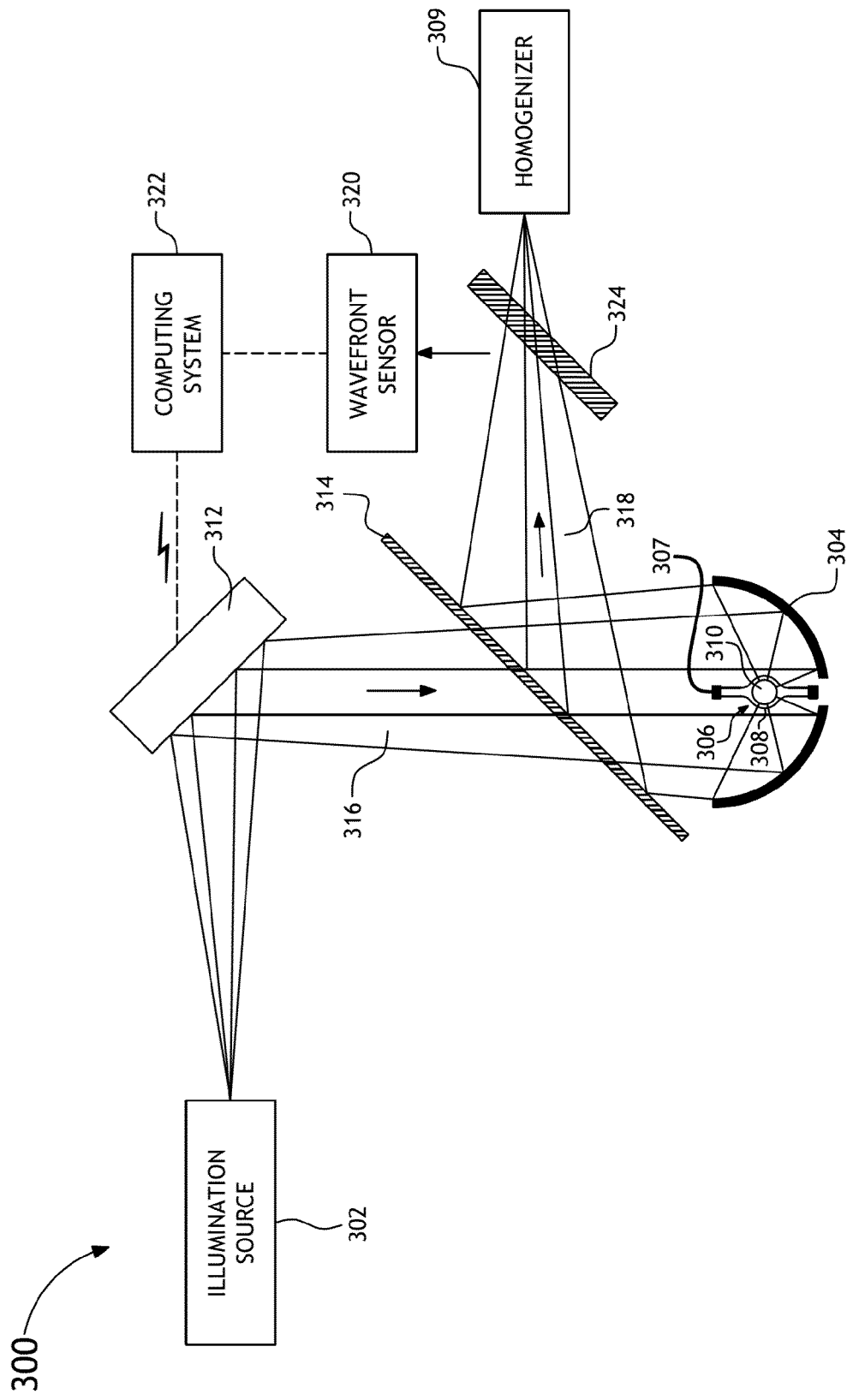
FIG. 3 is a block diagram view of a system for correcting aberrations caused by convection, in accordance with one embodiment of the present invention.

FIG. 3 illustrates a system 300 for correcting convection based aberrations, in accordance with one embodiment of the present invention. As in system 200, system 300 includes an illumination source 302 configured to generate illumination 316 of a selected wavelength, and a plasma cell 306 configured for generating a plasma within a bulb suitable for containing a selected gas 310 (e.g., argon, xenon, mercury or the like). In addition, the system 300 may include an ellipse 304 configured to focus illumination 316 emanating from the illumination source 302 into the volume of gas 310 contained within the bulb 308 of the plasma cell 306. It is noted herein that the above described components of FIG. 3 are similar to the like components of system 200. As such, the description of system 200 and the like components should be interpreted to extend to system 300.

In a further aspect of system 300, the system 300 includes one or more adaptive optics elements 312 configured to compensate for convection-induced aberrations. The system 300 may further include a wavefront sensor 320 configured to measure wavefront error along an optical pathway (e.g., illumination pathway 316 or collection pathway 318) of the system 300. For example, as shown in FIG. 3, the wavefront sensor 320 may be configured to measure wavefront error along the collection pathway 318. In this regard, the system 300 may include additional optical elements, such as beam splitter 324, in order to deflect a portion of the collection pathway illumination toward the wavefront sensor 320. It is noted herein that the above configuration should not be interpreted as limiting as it is anticipated that the wavefront sensor may be configured to measure wavefront error in the illumination pathway 316 and additional optical elements may be utilized to sample the given illumination pathway 316.

In another embodiment, the results of the wavefront sensing process may be fed to a communicatively coupled computer controller 322. The computer controller 322 may then determine the adaptive steps to perform that will best minimize the observed aberrations. In this sense, the computer controller 322 may execute a series of program instructions stored in memory and configured to control the adaptive optics 312 in order to minimize the convection-induced abberative effects. In turn, the computing control system 322 may transmit instructions to the adaptive optics 312 in order to execute the determined set of instructions. It is recognized herein that the feedback control loop of system 300 must operate rapidly relative to the feedback control loop described with respect to system 200. It is anticipated that the present system 300 may provide real-time or near-real-time feedback control of the adaptive optics 312.

It is further contemplated that the correction of convection-induced aberrations using system 300 may be carried out in conjunction with the correction of lower time scale abberative effects (e.g., abberative effects caused by components of optical system or operation conditions of optical system), such as those described in the context of system 200.

Figure 4:
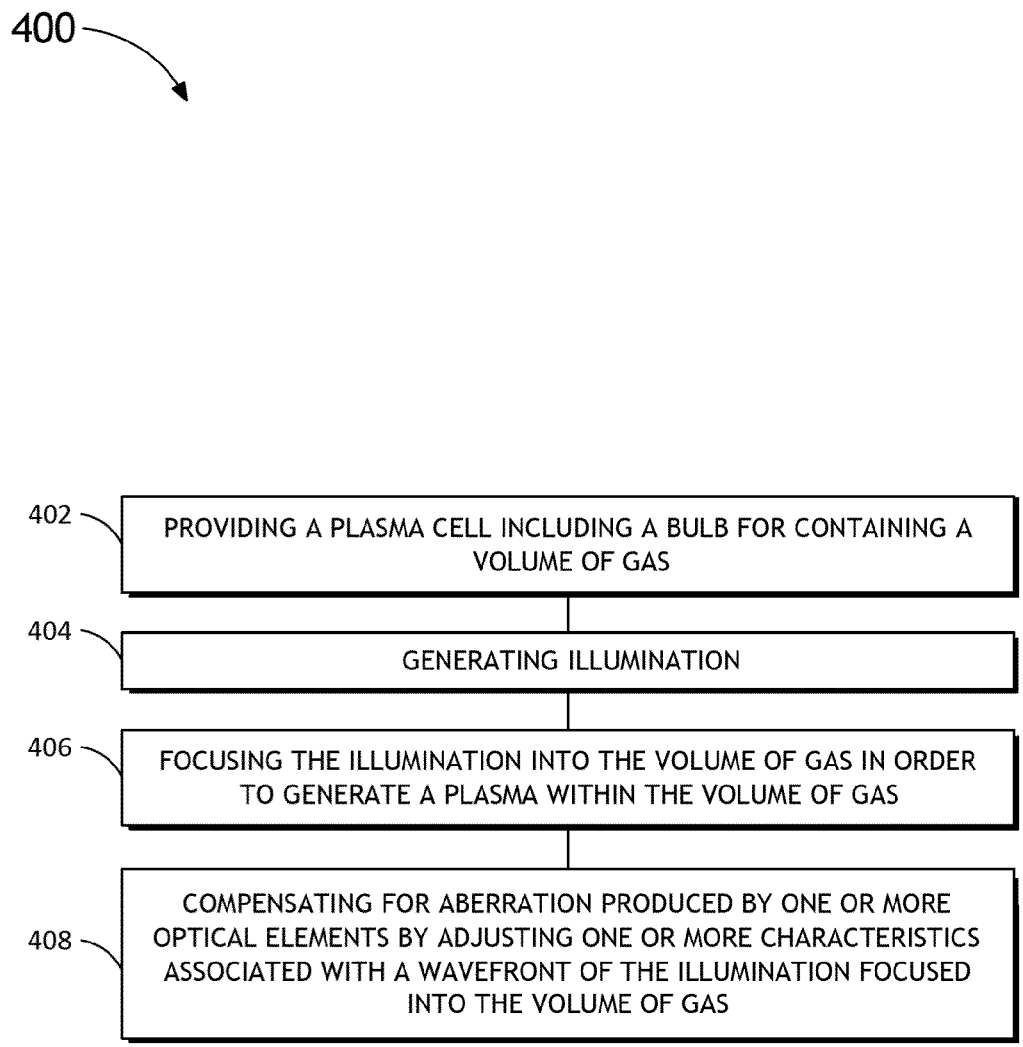
FIG. 4 is a flow diagram illustrating a method for correcting aberrations caused by one or more optical elements, in accordance with one embodiment of the present invention.

FIG. 4 is a flow diagram illustrating steps performed in a method 400 for correcting aberrations created by a plasma cell. Applicant notes that the embodiments and enabling technologies described previously herein in the context of system 200 should be interpreted to extend to method 400.

In a first step 402, a plasma cell including a bulb for containing a volume of gas is provided. For example, a plasma cell 206 including a bulb 208 containing a volume of gas a gas (e.g., pure gas or gas mixture) may be provided. In a second step 404, illumination is generated. For example, illumination of a selected wavelength may be generated utilizing an illumination source 202, such as a laser. In a third step 406, the illumination is focused into the volume of gas in order to generate plasma within the volume of gas. For example, the ellipse 204 may receive illumination from the illumination source 202 and focus the illumination into the gas 210 contained within the bulb 208 of the plasma cell 206. In a fourth step 408, aberration effects produced by one or more optical elements (e.g., bulb of the plasma cell, optical elements of illumination pathway, or optical elements of collection pathway) may be compensated for by adjusting one or more characteristics associated with a wavefront of the illumination focused into the volume of gas. For example, in response to a measured wavefront error, the system 200 may correct for the wavefront error by adjusting one or more adaptive optics 212 (e.g., deformable mirror) such that the wavefront error is reduced below an acceptable threshold.

Figure 5:
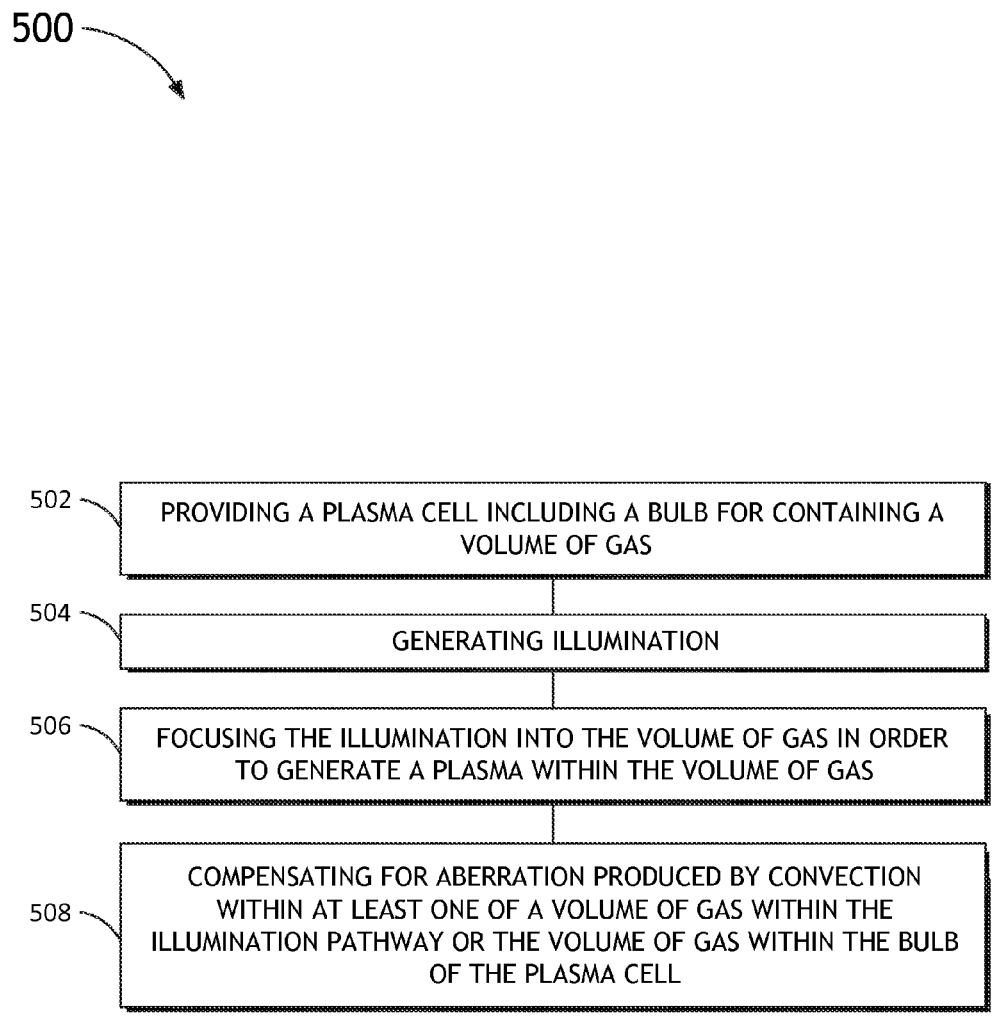
FIG. 5 is a flow diagram illustrating a method for correcting aberrations caused by convection, in accordance with one embodiment of the present invention.

FIG. 5 is a flow diagram illustrating steps performed in a method 500 for correcting convection based aberrations. Applicant notes that the embodiments and enabling technologies described previously herein in the context of system 300 should be interpreted to extend to method 500.

In a first step 502, a plasma cell including a bulb for containing a volume of gas is provided. For example, a plasma cell 306 including a bulb 308 containing a volume of gas a gas (e.g., pure gas or gas mixture) may be provided. In a second step 504, illumination is generated. For example, illumination of a selected wavelength may be generated utilizing an illumination source 302, such as a laser. In a third step 506, the illumination is focused into the volume of gas in order to generate plasma within the volume of gas. For example, the ellipse 304 may receive illumination from the illumination source 302 and focus the illumination into the gas 310 contained within the bulb 308 of the plasma cell 306. In a fourth step 508, abberative effects produced by convection (e.g., convection occurring in a gas of the illumination or collection pathway or convection occurring in the gas/plasma of the plasma cell 206) may be compensated by adjusting one or more characteristics associated with a wavefront of the illumination focused into the volume of gas 310. For example, in response to a measured wavefront error, the system 300 may correct for the wavefront error by adjusting one or more adaptive optics 312 (e.g., deformable mirror) such that the wavefront error is reduced below an acceptable threshold.

All of the system and methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Furthermore, it is to be understood that the invention is defined by the appended claims.

What is claimed:

1. An apparatus for correcting aberrations created in a plasma cell, comprising:
    an illumination source configured to generate illumination;
    a plasma cell, the plasma cell including a bulb for containing a volume of gas;
    an ellipse configured to focus illumination from the illumination source into the volume of gas in order to generate a plasma within the volume of gas; and
    one or more adaptive optical elements configured to compensate for aberrations produced by one or more optical elements, the one or more adaptive optics elements positioned along an illumination pathway between the illumination source and the plasma cell.

2. The apparatus of claim 1, wherein the aberrations are produced by the bulb of the plasma cell.

3. The apparatus of claim 1, wherein the aberrations are produced by one or more optical elements of the illumination pathway.

4. The apparatus of claim 1, wherein the aberrations are produced by one or more optical elements of a collection pathway between the plasma cell and a target.

5. The apparatus of claim 1, wherein the aberrations are generated at least by a manufactured characteristic of at least one of the bulb of the plasma cell, the one or more optical elements of the illumination pathway, or one or more optical elements of a collection pathway.

6. The apparatus of claim 1, wherein the aberrations are generated by an operational condition of at least one of the bulb of the plasma cell, the one or more optical elements of the illumination pathway, or one or more optical elements of a collection pathway.

7. The apparatus of claim 6, wherein the operational condition comprises:
    at least one of deformation or stress.

8. The apparatus of claim 1, further comprising:
    one or more sensors configured to measure one or more characteristics of the plasma contained within the bulb of the plasma cell.

9. The apparatus of claim 1, further comprising:
    one or more computing systems communicatively coupled to the sensor and configured generate one or more merit functions of the plasma contained within the bulb of the plasma cell utilizing the one or more characteristics measured by the one or more sensors.

10. The apparatus of claim 9, wherein the one or more merit functions comprise:
    at least one of a brightness of the plasma, an amplitude of a selected emission line of the plasma, a plasma temperature, a plasma size, a plasma shape, a beam profile of illumination transmitted through the bulb.

11. The apparatus of claim 1, wherein the one or more adaptive optics comprise:
    a deformable mirror.

12. The apparatus of claim 11, wherein the deformable mirror is configured to correct wavefront error produced by the one or more optical elements.

13. The apparatus of claim 12, wherein the one or more adaptive optics comprise:
    a tip-tilt adjuster configured to adjust the tip-tilt of the deformable mirror.

14. The apparatus of claim 1, further comprising:
    a correction plate configured to correct wavefront error produced by the one or more optical elements.

15. The apparatus of claim 1, wherein the illumination source comprises:
one or more lasers.

16. The apparatus of claim 15, wherein the one or more lasers comprise:
at least one of a diode laser, a continuous wave laser, or a broadband laser.

17. The apparatus of claim 1, wherein the gas comprises:
one or more inert gases.

18. The apparatus of claim 17, wherein the gas comprises:
at least one of argon or xenon.

19. The apparatus of claim 1, wherein the gas comprises:
one or more non-inert gases.

20. The apparatus of claim 19, wherein the gas comprises:
mercury.

21. An apparatus for correcting aberrations in a plasma cell, comprising:
an illumination source configured to generate illumination;
a plasma cell, the plasma cell including a bulb for containing a volume of gas;
an ellipse configured to focus illumination from the illumination source into the volume of gas in order to generate a plasma within the volume of gas; and
one or more adaptive optics elements configured to compensate for aberrations produced by one or more optical elements, the one or more adaptive optics elements positioned along a collection pathway between the plasma cell and a target of illumination from the plasma cell.

22. An apparatus for correcting convection based aberrations, comprising:
an illumination source configured to generate illumination;
a plasma cell, the plasma cell including a bulb for containing a volume of gas;
an ellipse configured to focus illumination from the illumination source into the volume of gas in order to generate a plasma within the volume of gas; and
one or more adaptive optics elements configured to compensate for aberrations produced by convection, the one or more adaptive optics elements positioned along an illumination pathway between the illumination source and the plasma cell.

23. The apparatus of claim 22, wherein the one or more adaptive optics elements are configured to compensate for aberrations produced by convection in a gas within at least one of the illumination pathway or a collection pathway.

24. The apparatus of claim 22, wherein the one or more adaptive optics elements are configured to compensate for aberrations produced by convection within the volume of gas of the bulb of the plasma cell.

25. The apparatus of claim 22, further comprising:
a wavefront sensor positioned in the illumination pathway or a collection pathway;
a controller communicatively coupled to the wavefront sensor, the controller configured to control the one or more adaptive optics in response to one or more measurements received from the wavefront sensor.

26. A method for correcting aberrations in a plasma cell, comprising:
providing a plasma cell including a bulb for containing a volume of gas;
generating illumination;
focusing the illumination into the volume of gas in order to generate a plasma within the volume of gas; and
compensating for aberration effects produced by one or more optical elements by adjusting one or more characteristics associated with a wavefront of the illumination focused into the volume of gas.

27. The method of claim 26, wherein the generating illumination comprises:
generating laser radiation utilizing one or more lasers.

28. The method of claim 27, wherein the one or more lasers comprise:
at least one of a diode laser, a continuous wave laser, or a broadband laser.

29. The method of claim 26, wherein the compensating for aberration effects produced by one or more optical elements by adjusting one or more characteristics associated with a wavefront of the illumination focused into the volume of gas comprises:
compensating for aberration produced by the one or more optical elements by adjusting one or more characteristics associated with a wavefront of the illumination focused into the volume of gas utilizing one or more adaptive optics elements.

30. The method of claim 29, wherein the compensating for aberration produced by the one or more optical elements by adjusting one or more characteristics associated with a wavefront of the illumination focused into the volume of gas utilizing one or more adaptive optics elements comprises:
compensating for aberration produced by the one or more optical elements by adjusting one or more characteristics associated with a wavefront of the illumination focused into the volume of gas utilizing a deformable mirror.

31. The method of claim 29, wherein the compensating for aberration produced by the bulb of the plasma cell by adjusting one or more characteristics associated with a wavefront of the illumination focused into the volume of gas utilizing one or more adaptive optics elements comprises:
compensating for aberration produced by the bulb of the plasma cell by adjusting one or more characteristics associated with a wavefront of the illumination focused into the volume of gas utilizing a correction plate.

32. The method of claim 29, wherein the compensating for aberration produced by the one or more optical elements by adjusting one or more characteristics associated with a wavefront of the illumination focused into the volume of gas utilizing one or more adaptive optics elements comprises:
compensating for aberration produced by the bulb of the plasma cell by adjusting one or more characteristics associated with a wavefront of the illumination focused into the volume of gas utilizing utilizing a tip-tilt adjuster.

33. The method of claim 26, wherein the gas comprises:
one or more inert gases.

34. The method of claim 26, wherein the gas comprises:
one or more non-inert gases.

35. The method of claim 26, further comprising:
measuring one or more characteristics of the plasma contained within the bulb of the plasma cell.

36. The method of claim 35, further comprising:
generating one or more merit functions of the plasma contained within the bulb of the plasma cell utilizing the measured one or more characteristics of the plasma.

37. The method of claim 36, wherein the one or more merit functions comprise:
at least one of a brightness of the plasma, an amplitude of a selected emission line of the plasma, a plasma temperature, a plasma size, a plasma shape, a beam profile of illumination transmitted through the bulb.

38. A method for correcting convection based aberrations, comprising:
providing a plasma cell including a bulb for containing a volume of gas;

generating illumination;
focusing the illumination into the volume of gas in order to generate a plasma within the volume of gas; and
compensating for aberration produced by convection within at least one of a volume of gas within the illumination pathway or the volume of gas within the bulb of the plasma cell.

* * * * *